United States Patent [19]

Robbins

[11] Patent Number: 4,575,418

[45] Date of Patent: Mar. 11, 1986

[54] COAL CLEANING AND THE REMOVAL OF ASH FROM COAL

[75] Inventor: Lanny A. Robbins, Midland, Mich.

[73] Assignee: The Dow Chemical Company, Midland, Mich.

[21] Appl. No.: 657,327

[22] Filed: Oct. 3, 1984

[51] Int. Cl.⁴ .................... B03B 5/28; C10L 1/00; C07C 5/00

[52] U.S. Cl. ...................................... 209/3; 209/172; 241/20; 44/1 SR; 570/263; 203/42; 203/49

[58] Field of Search .............. 209/172, 173, 3, 162, 209/171; 241/20, 79.1; 203/49, 42, 96; 210/774, 804, 805; 570/262, 263, 238, 239; 44/1 SR, 2

[56] References Cited

U.S. PATENT DOCUMENTS

| 1,294,519 | 2/1919 | Moxham | 209/172 |
| 2,150,917 | 3/1939 | Fonlke et al. | 209/172 |
| 2,496,703 | 2/1960 | Ekbom | 209/172.5 |
| 2,686,592 | 8/1954 | Miller | 209/172 X |
| 3,599,879 | 8/1971 | Clark | 241/20 |
| 4,173,530 | 11/1979 | Smith et al. | 209/172 |
| 4,198,289 | 4/1980 | Elliot et al. | 209/172 X |
| 4,324,560 | 4/1982 | Fonseca | 241/20 X |

FOREIGN PATENT DOCUMENTS

0695241 10/1964 Canada ......................... 209/172

Primary Examiner—Frank W. Lutter
Assistant Examiner—Thomas M. Lithgow
Attorney, Agent, or Firm—G. R. Baker

[57] ABSTRACT

There is disclosed the process for the separation of the clay particles (ash) from coal particles by the use of two immiscible liquids followed by the separation and removal of the liquids from the solids.

13 Claims, 8 Drawing Figures

COAL CLEANING AND THE REMOVAL OF ASH FROM COAL

BACKGROUND OF THE INVENTION

There are several processes described in the prior art wherein coal is separated from the clay particles (ash) by froth flotation, oil agglomeration or sink/float sedimentation techniques. The oil agglomeration technique utilizes partitioning of the coal particles into an oil droplet or at least preferentially wetting of the coal by the oil to form an agglomerate. This does not generally allow for additional deashing of the coal-oil phase and generally the oil is left on the coal to be burned with the coal. Froth flotation techniques utilize the preferential wetting of the coal with a solvent and the preferential clinging of air bubbles to the hydrophobic surfaces. While some countercurrent repulping of the coal and reflotation can be conducted, usually in a countercurrent manner, froth flotation is usually not efficient enough to recover coal particles smaller than about 100 mesh.

In addition, there have been several disclosures in the prior art of the separation of the coal from the clay particles employing chlorinated hydrocarbon solvent/water solvent mixtures using liquid cyclones and/or rotary vacuum disc filters after partitioning for the separation of the two partitioned components to remove and recover the solvents.

None of these techniques are sufficiently efficient, by today's standards, to remove ash from the coal and enhance the coal burning Btu content on the pound basis nor to effectively bring the pyrite or sulfide sulfur components to a level low enough to effectively employ present day sulfurous gas removal from the combustion gases. It would, therefore, be advantageous to have a process which is capable of handling large quantities of coal and its attendant clay and ash in an economical manner.

BRIEF DESCRIPTION OF THE INVENTION

The present invention obtains a solid-solid separation in a liquid-liquid system in a mixer-settler system wherein the settler may be, for example, a moving rake-type device to keep the solvent coal slurry viscosity low enough to allow the water phase to disengage from the solvent phase and even allow countercurrent washing of the solvent coal slurry phase with water. Following the separation of the water-clay phase, the coal-solvent phase is thermally desolventized and the aqueous phase is desolventized by gas/vapor stripping.

The preferred method for carrying out the process of the present invention combines several unit operations utilizing an organic medium and water to effectively separate coal, including lignites, from the attendant clays and other ash forming constituents. The organic medium may be heavier or lighter than water, and includes the halogenated hydrocarbons as methylene chloride, 1,1,2-trichloroethylene,1,1,1-trichloroethane or perchloroethylene, the petroleum distillates and the like.

The process is preferably carried out by slurrying a fine coal which contains the attendant ash constituents, e.g. clay, sulfides and the like admixed therewith, with an organic medium under conditions which allow the coal and its attendant ash to be wet by the organic medium and/or the water. For best results the solids should be −20 mesh to +325 mesh. The preferred technique for preparing the slurry is to use first a centrifugal mixer and then a blade mixer. The first mixer insures intimate contact of the solids with each liquid component of the slurry. The second mixer allows some initial disengagement of the water phase and its occluded ash from the organic medium and its occluded coal. While other schemes are operable to varying degrees, the arrangement aforedescribed appears to offer the most efficient in respect to sizing of the equipment and power requirements throughout the process.

Following the slurry preparation step, the slurry is introduced into a raked settled, e.g. a raked columnar or Dorr style settler wherein disengagement of the coal-organic phase from the water-ash phase is completed. An additional advantage of the use of a raked settler when used in accordance with the present invention is that much of the pyrite will settle to the sludge and the coal will have a lower sulfur content as well as a lower ash content. Preferably, the downward moving coal and organic phase, when the organic is heavier than water, and the upward moving organic phase, when it is lighter than water, can be and preferably is washed with water, below or above respectively, the interface.

The aqueous phase, with clay (ash) in it is air blown to remove residual organic medium. The organic medium is removed from the air by absorbing it in mineral oil. The solvent is then stripped from the oil with steam, condensed and returned to the process. The lean mineral oil is recycled to the absorber.

When the coal-organic media phase is withdrawn from the stripper, the bulk of the organic media is removed in a filtering process (preferably a disk filter) and the coal finally dried preferably in a Torus disk dryer. The solvent from the latter steps is condensed and both it and the filtrate from the bulk solvent removal step are recycled.

In one preferred embodiment of the present invention the several unit operations are exemplified in various combinations which, in varying degrees of efficiency, separate coal from its ash using a heavy media-water system. It has now been found that if the coal and its attendant ash are slurried in a heavy media (preferably a chlorinated hydrocarbon) and the water and the resulting slurry introduced into a raked settler an effective reduction in the ash content of the coal can be achieved and the coal product and ash can be dried to recover the heavy media sufficiently to enable the coal to meet specifications for burning and the ash from the separation can be disposed of in an environmentally accepable manner.

It has also been found that while separation of the ash from the coal can be made by simple two stage operations, it is advantageous to use a very intensive mixing of the coal and its attendant ash with the heavy-media-and-water followed by a low intensity mixing then disengagement of the phases in a raked settler. Numerous high intensity mixers were tried including cyclones. However, a centrifugal disperser with a moderate recycle appears to be the most advantageous for use in large commercial scale plants.

During the investigation the point of introduction of the slurry, the wash water, the withdrawal of the raffinate and product were studied, as well as the downflow rate of heavy media with respect to water content of the product and ash retention in the water leaving with the product. The several examples, drawings and graphs illustrate the effects of these various paramenters on the efficiency of the recovery of product and the ash reduction potential.

It is to be understood that the equipment exemplified in the examples and flow diagrams is representative only of elements which achieve a desired result, e.g. cyclones and centrifugal pumps to acquire a high intensity mixing, and that other equipment known to achieve the desired result may be employed.

The several flow diagrams illustrated in the drawings demonstrate the various pieces of equipment which can be employed to effectuate the separation of ash from coal in accordance with the present invention.

DETAILED DESCRIPTION OF THE INVENTION

EXAMPLE I

A 5.0% coal-in-water slurry was made up with a Homer City, Pa. −325 mesh coal, initial percent ash 23.9%. Three-hundred fifty grams of the 5% slurry were placed in a one liter, stirred separatory vessel and agitated at 180 rpm. One-hundred seventy-five grams of perchloroethylene were added to the slurry and agitation at 180 rpm for 5 minutes. The agitation was stoppd and the bottom phase, 168.5 grams perchloroethylene and coal, drained off. The vessel was emptied and the perc-coal phase returned to the vessel and 332.5 grams of water added. The mixture was agitated at 200 rpm for 5 minutes, then stopped and allowed to settle. The bottom, perc-coal phase, 152.4 grams, was then drawn off the bottom. The pot was emptied and the bottom phase returned to the vessel, water added, agitated, settled, and the bottom phase separated as before until 4 wash-decant cycles were completed. After the fourth decant, the coal-perc slurry was placed in an evaporating pan and evaporated to dryness at 70° C. The ash content of the dried coal was 4.8%, see Table I.

A sample of Powhatan mine coal tailings, 63 mesh, original percent ash 25.3%, was washed in the same manner as the Homer City coal and produced an ash value of 11.0%, see Table I.

TABLE I

ASH CONTENT OF PERCHLOROETHYLENE CLEANED COAL

| | Coal Source | |
|---|---|---|
| | Homer City | Powhatan Mine |
| % Ash, Original | 23.9 | 25.3 |
| Coal Particle Size | <325 mesh | <63 mesh |
| Coal Slurry, % | 5.5 | 5.0 |
| Perc-Coal Ratio | 10:1 | 10:1 |
| Number of Washes | 4 | 4 |
| % Yield | 14 | 28 |
| % Ash in Cleaned Coal | 4.8 | 11.0 |

EXAMPLE II

In the following series of preliminary coal-cleaning experiments, a one-inch diameter cyclone separator, Type P Doxie, manufactured by the Dorr-Oliver Co. was evaluated as a separating device for separating the water-clay and the perc-coal phase.

Figure 2:
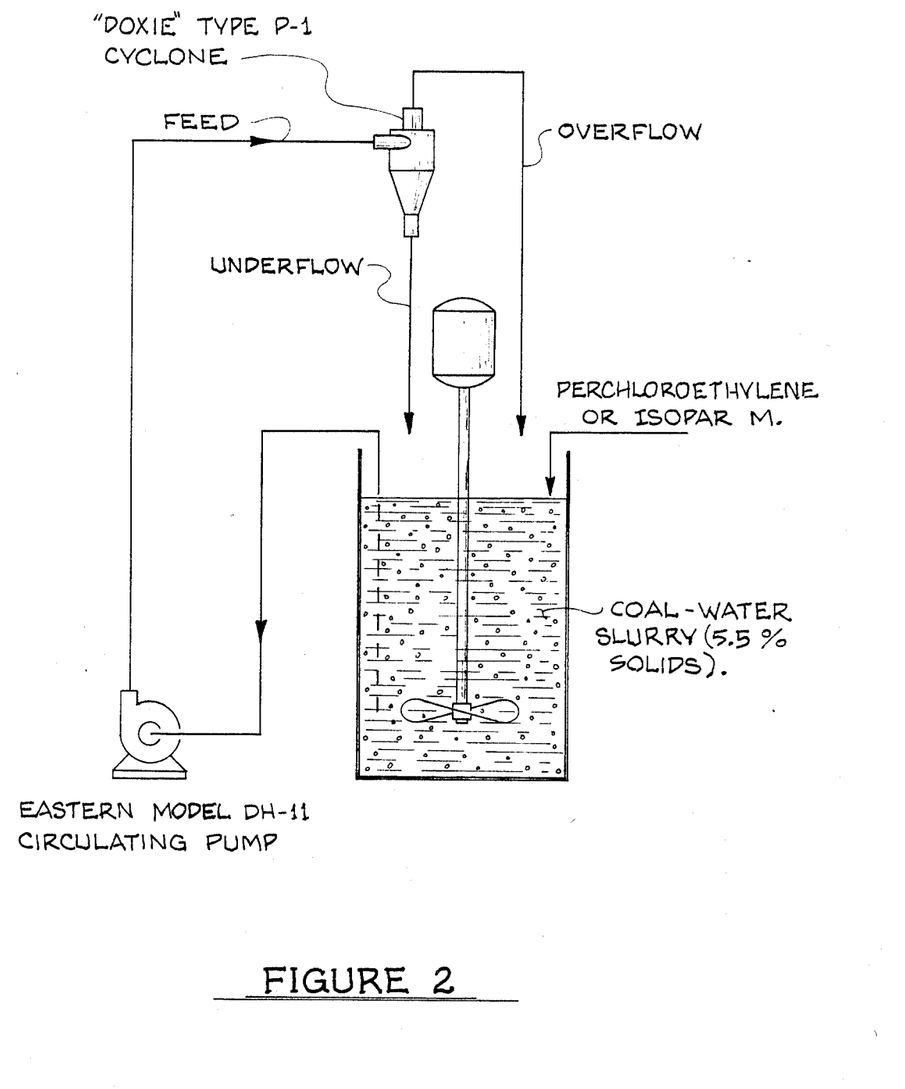
FIG. 2 shows a modified laboratory scale miniplant which employs a circulating pump to feed a cyclone with a coal perchloroethylene water slurry from a stirred mix tank employed for comparative purposes.

The "Doxie" cyclone was mounted above a five-gallon can with an Eastern centrifugal pump Model DH-11 as feed to the cyclone, FIG. 2. The underflow and overflow from the cyclone was piped back into the five-gallon can, allowing the cyclone feed to recycle through the cyclone via the recirculating pump.

The first experiment with the Doxie cyclone was to determine if the cyclone would separate ash from coal without the use of a solvent. Twenty-five pounds of 5.5% solids, Powhatan Mine Tailings, aqueous slurry, 39% ash, were placed in the five-gallon can and recycled through the Doxie cyclone separator. Samples were taken of the underflow and overflow, placed in evaporating pans, and evaporated to dryness in an air oven at 110° C. Duplicate sample ash values were obtained on the dried samples. See Table II.

TABLE II

| ASH ANALYSIS - CYCLONE, WATER ONLY | |
|---|---|
| Sample | % Ash |
| Feed to Doxie | 39.0 |
| "Doxie" Underflow | 32.6 |
| "Doxie" Overflow | 72.9 |

The underfow sample provided a rather unimpressive 16.4% reduction in coal ash.

EXAMPLE III

Employing the same apparatus in FIG. 2 to evaluate the "Doxie" cyclone separator with a "heavier-than-water" solvent, 25.45 lbs. of 5.5% solids Powhatan mine tailings in water were recirculated through the "Doxie" cyclone, then 15.0 lbs. of perchloroethylene added to the tank with agitation. The mixture was recirculated through the "Doxie" separator for 10 minutes, then 1-quart samples were drawn from the underflow. The samples were placed in evaporating pans, the liquid evaporated off, and ash values obtained on the samples that contained coal. Observations, coal weights, and ash value are shown in Table III.

TABLE III

COAL CLEANING WITH PERCHLOROETHYLENE AND WATER USING A "DOXIE" CYCLONE SEPARATOR

| Sample No. | Sample Description | gms Solids | % Ash |
|---|---|---|---|
| — | Feed | — | 39.0 |
| 1 | Clear Amber Underflow - Very Little Coal | <1 | — |

TABLE III-continued
COAL CLEANING WITH PERCHLOROETHYLENE AND WATER USING A "DOXIE" CYCLONE SEPARATOR

| Sample No. | Sample Description | gms Solids | % Ash |
|---|---|---|---|
| 2 | Clear Amber Underflow - Very Little Coal | <1 | — |
| 3 | Clear Amber Underflow - Little Coal | 7.2 | — |
| 4 | 2 Phase Underflow - 1" Milky Layer on Top Mostly Perc, Coal, some Water | 28.5 | 4.7 |
| 5 | Milky Layer Underflow, Some Coal on Bottom | 29.3 | 19.6 |
| 6 | Milky Phase (Water) Underflow | 25.7 | 79.6 |
| 7 | Overflow | 12.2 | — |

The #4 cut coal contained 4.7% ash, showing a 87.9% reduction from the original ash content of 39%.

EXAMPLE IV

The Doxie cyclone system FIG. 2, was evaluated with a light solvent, Kerosene (ISOPAR M), in the same manner as the heavy solvent. The water and clay phase came off with the first samples while the solvent and coal came off with the latter samples. The liquid was evaporated off the samples and ash values obtained. Observations, coal weights, and ash values are shown in Table IV.

The #5 cut had an ash value of 10.3%, which was a 73.6% ash reduction from the original 39% ash in the Powhatan Mine tailings.

TABLE IV
COAL CLEANING WITH KEROSENE (ISOPAR M) AND WATER USING A "DOXIE" CYCLONE SEPARATOR

| Sample No. | Sample Description | Wt. (gms) | % Ash |
|---|---|---|---|
| — | Feed | — | 39.0 |
| 1 | Water, Clay, Milky Underflow, Very Little Coal | 27.0 | 75.7 |
| 2 | Water, Clay, Milky Underflow, Very Little Coal | 24.9 | 65.2 |
| 3 | 2 Phase, Water, ISOPAR M Underflow, Clay and Coal | 50.7 | 27.4 |
| 4 | ISOPAR M, Coal Underflow (Coal at Bottom) | 45.5 | 12.4 |
| 5 | ISOPAR M, Coal Underflow (Coal at Bottom) | 9.7 | 10.3 |
| 6 | Residue - Bottom of Slurry Can | 112.0 | 23.0 |

The experiment using the "Doxie" cyclone separator with a "lighter than water" solvent, ISOPAR M, specific gravity 0.78, showed that coal cleaning could also be achieved with a low-density solvent. In the case of the ISOPAR M solvent experiment, the milky clay-water phase appeared in the first "underflow" cuts and analyzed high in ash content. As the cuts progressed, the ash content became less and less until the best coal was achieved in the ISOPAR M layer, fourth cut, 12.4% ash, fifth cut, 10.3% ash. It is apparent that reasonable "coal cleaning" can also be achieved with a "lighter than water" solvent.

EXAMPLE V

Figure 3:
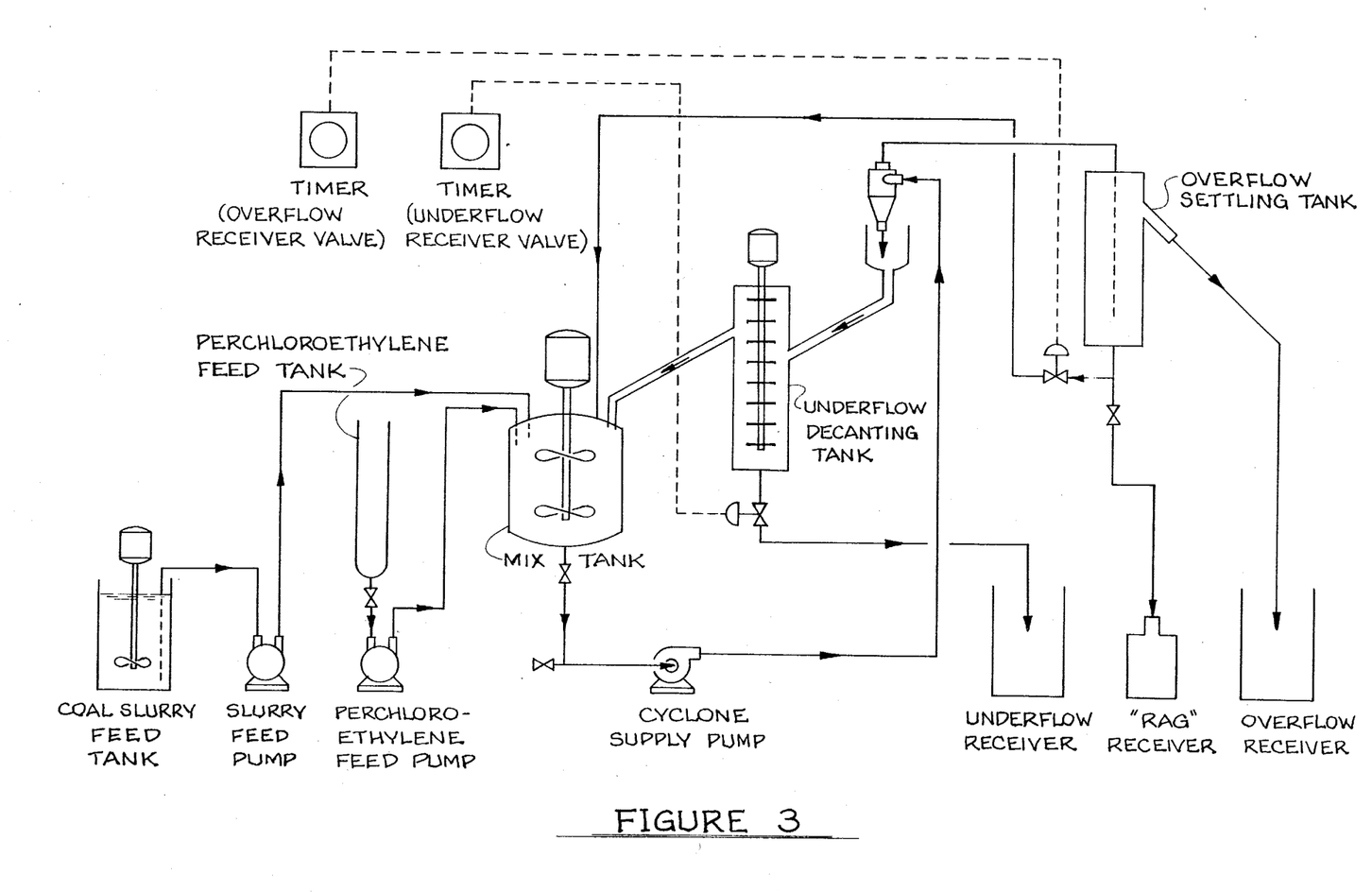
FIG. 3 shows a modified miniplant in which both the cyclone and blade mixer are employed with a raked settler.

The first run in a coal-cleaning miniplant, shown in FIG. 3, and the elements of which are described in Table V was conducted using a Powhatan mine tailing water slurry, 5.5% solids, through a 63 mesh screen. The original ash content of the coal tailings was 39% ash.

The run was started by filling the mix tank, the underflow decant tank, and the overflow settling tank with perchloroethylene using the cyclone pump. When the tanks were up to level, the perc pump was adjusted to 9.5 lb/hr and the underflow timer valve set to maintain a constant level in the mix tank. The coal slurry was then fed into the mix tank at 50 lb/hr. Slurry and perc feed rates, as well as decant tank discharge rates, were recorded. See Table VI.

TABLE V
COAL-CLEANING MINIPLANT EQUIPMENT ITEMS (PERCHLOROETHYLENE, CYCLONE SEPARATION PROCESS)

1. Coal Slurry Feed Tank - Heresite-lined can, 5 gallon capacity, with Gast 4AM-FRV-30 air motor with agitator.
2. Slurry Feed Pump - Masterflex, Model 7015 pump, 30–600 rpm, silicone tubing.
3. Perc Feed Tank - 2000 ml graduated glass container (3¼" diameter × 18").
4. Perc Feed Pump - Masterflex, Model 7015 pump, 5–100 rpm, Viton tubing.
5. Slurry-Solvent Mix Tank - 7½" diameter × 12", 2.18 gallon capacity with propeller agitator, heller electric motor drive.
6. Cyclone Supply Pump - Eastern DH-11 stainless steel centrifugal pump, 1750 rpm.
7. Cyclone Separator - Dorr-Oliver, "Doxie" cyclone separator, 1" Type P, Kynar construction, 1.4 gpm.
8. Underflow Decanting Tank - 4" diameter × 15", .85 gallon capacity, agitated (rake-type agitator), Masterflex drive.
9. Overflow Settling Tank - 4" diameter × 15", .85 gallon capacity.
10. Underflow Receiver - 5 gallon, Heresite can.
11. Overflow Receiver - 5 gallon, Heresite can.
12. "Rag" Receiver - 1 quart glass bottle.

TABLE VI
COAL-CLEANING MINIPLANT RUN 6

| Time | COAL # | SLURRY #/hr | PERC cc | FEED #/hr | DECANT # | TANK #/hr | Comment |
|---|---|---|---|---|---|---|---|
| 0919 | 36.20 | — | 1800 | — | .37 | — | Slurry Sampled |
| 0929 | 28.79 | 41.4 | 1460 | 7.7 | 1.80 | 9.15 | Coal collecting on surface |
| 0939 | 20.67 | 48.4 | 960 | 10.7 | 3.40 | 9.6 | in settling tank |
| 0949 | 13.00 | 46.0 | 580 | 8.1 | 4.99 | 9.5 | |
| 0959 | 39.60 | — | 1710 | — | .62 | — | Filled feed and perc tank |
| 1014 | 28.05 | 43.0 | 1000 | 10.1 | 3.03 | 9.6 | Gobs of coal coming over top of settling tank |
| 1029 | 16.42 | 46.5 | 300 | 10.0 | 1.40 | — | Very little coal coming out decant tank Stopped run. |
| 1031 | END OF RUN | | | | | | Samples (decant) (settling) |

A significant amount of "floating coal" came over the top of the settling tank that needed to be recycled back into the mix tank. A build-up of coal also occurred on the top of the decant tank and recycled back into the mix tank. Very little coal settled to the bottom of the decant tank. Since the coal was apparently recycling through the system and not discharging out of the bottom of the decant tank as intended, the run was stopped. No samples were analyzed.

EXAMPLE VI

Figure 4:
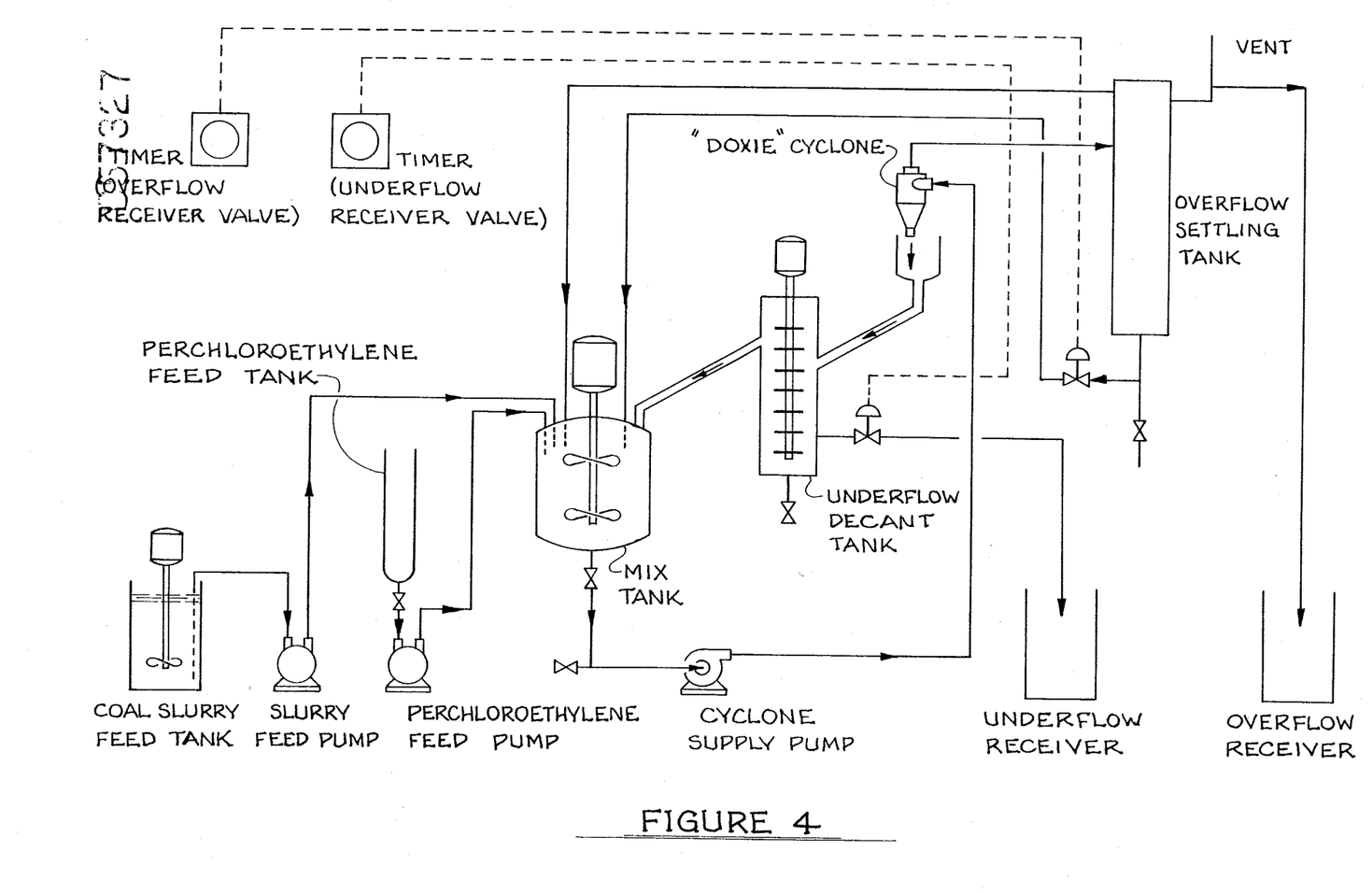
FIG. 4 illustrates the miniplant of FIG. 3 with coal-perc side draw and pyrite-perc underflow.

The miniplant overflow settling tank was modified to bring floaters back to the mix tank and the underflow tank was modified to take per-coal off as a side-draw, FIG. 4. Run 12 was made using Powhatan tailing slurry, 5.5% solids, through a 63 mesh screen. The decant and settling tanks were filled in the same manner as in Run 6, except the water/perc ratio wasadjusted so a small amount of water was discharged through the cyclone underflow and created a perc-water interface in the decanter. The coal-water slurry and perc feed pumps were started, and the perc-coal slurry timer valve actuated. Run data for Run 12 is shown in Table VII.

TABLE VII

| | | | | | | DECANT | TANK | SLURRY | | |
|---|---|---|---|---|---|---|---|---|---|---|
| | COAL | SLURRY | PERC | | | Valve | | Valve | S.T. | |
| Time | # | #/hr | cc | #/hr | # | #/hr | On/Off | On/Off | Comments |
| 1301 | 41.14 | — | 2030 | — | 0.0 | — | .5/73 | 2.0/1.0 | |
| 1313 | 31.30 | 49.2 | 1520 | 9.12 | 1.97 | 9.8 | .5/73 | 1.25/1.25 | "Floaters" on |
| 1325 | 23.66 | 38.2 | 800 | 12.88 | 4.12 | 10.75 | .5/73 | 1.25/1.25 | settling tank not |
| 1341 | 13.55 | 37.9 | 1560 | — | 8.85 | 17.7 | .5/73 | 1.25/1.25 | drawing off very well |
| 1354 | 37.92 | — | 820 | 12.20 | 10.67 | 8.4 | .5/73 | 1.25/1.25 | Sample 1 (Overflow) |
| 1404 | 31.60 | 37.9 | 120 | 9.25 | 1.218 | 9.0 | .4/73 | 1.25/1.25 | Sample 2 (Bottom decant tank) Starting to collect |
| 1419 | 22.02 | 38.3 | 1000 | — | 14.40 | 8.9 | .4/73 | 1.25/1.25 | Coal-perc sample |
| 1429 | 28.19 | — | 300 | 15.00 | — | — | .6/73 | 1.25/1.25 | Sample 3 (coal-perc sample) |
| 1435 | 28.13 | — | — | — | — | — | — | — | Feed slurry line plugged END OF RUN |

Samples of the feed slurry, overflow, bottom of decant tank, and coal-perc side-draw slurry were placed in evaporating pans and evaporated to dryness at 110° C. Ash analysis was run on the samples with results as shown in Table VIII.

TABLE VIII

| | Ash Values, Run 12 | |
|---|---|---|
| Sample No | Description | % Ash |
| | Feed Slurry | 39.0 |
| 1 | Settling Tank Overflow | 87.5 |
| 2 | Bottom Decant Tank | 26.8 |
| 3 | Coal-Perc Slurry | 9.3 |

As each run was completed, it became apparent that most of the coal was accumulating at the interface between the perc and the water layer. In Run 6, when a high-perc-to-water ratio was used, the cyclone separator partitioned the water, most of the coal, and some of the perc into the settling tank, with very little coal being discharged from the underflow decant tank.

Run 12 was made with equipment revisions on the decant and settling tank. The major revision was installation of a side draw coal-perc slurry discharge at the perc-water interface in the decant tank. The coal-perc slurry was withdrawn from the interface with no plugging problems. There was a small amount of water visible in the coal-perc slurry as it was withdrawn from the decant tank. The ash value of the dried coal-perc slurry was 9.3%, a respectable reduction from the original ash content of 39%. The clay-water overflow analyzed 87.5%, indicating high ash removal in the overflow.

EXAMPLE VII

Figure 1:
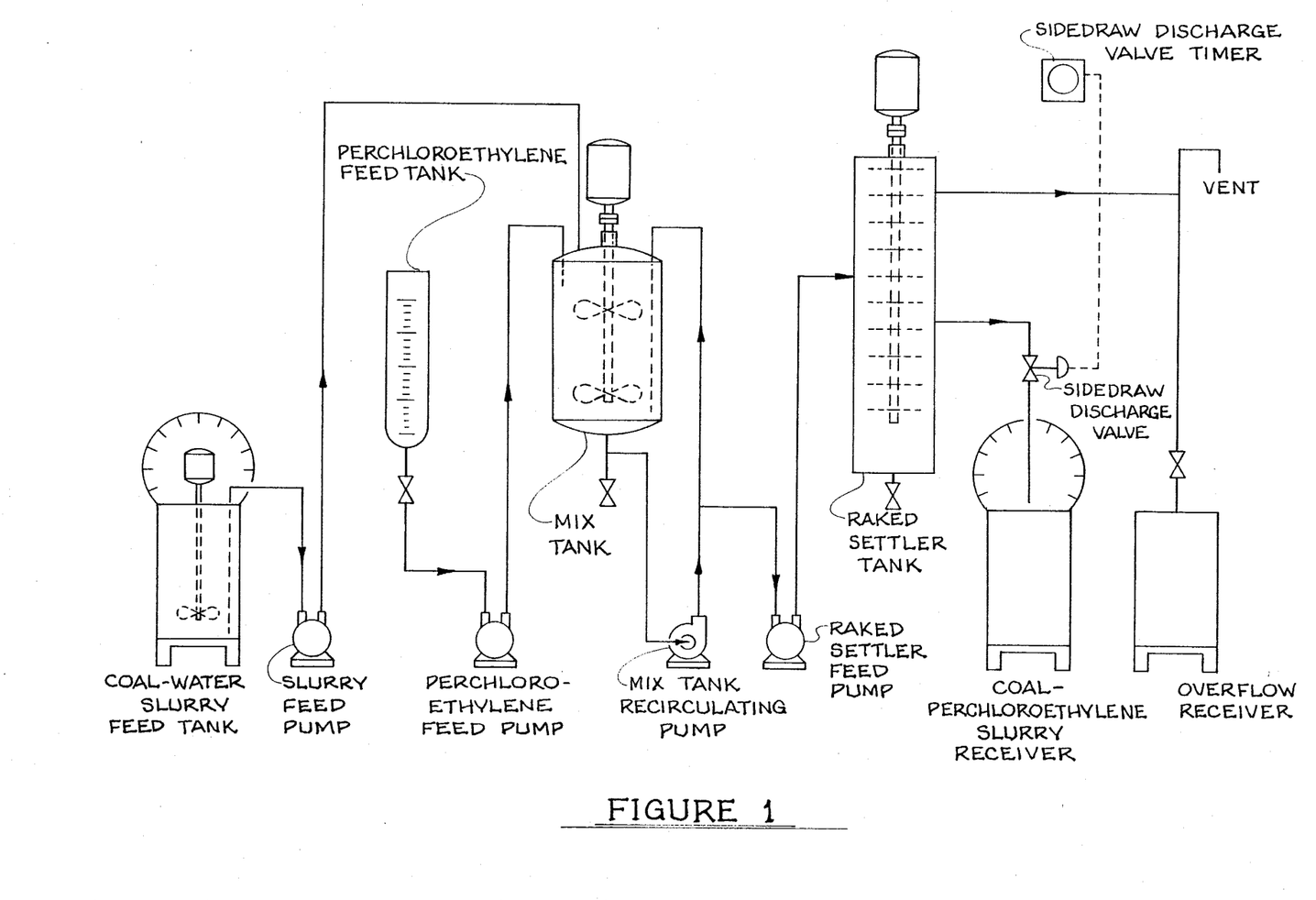
FIG. 1 shows a laboratory scale miniplant.

The miniplant underflow tank in FIG. 3 was initially designed as a raked settler to keep the coal suspended in perchloroethylene and to allow water droplets to disengage from the slurry. During operation of the miniplant in FIG. 3 the raked underflow tank was discovered to work well enough to separate the water and perchloroethylene layers with a visible interface. Consequently, the cyclone and overflow settling tank were removed from the miniplant, FIG. 1.

A sample of tailings from a coal mine was fed as a slurry in water to the mix tank at a rate of 2.2 lb./hr tailings and 37.8 lb/hr of water. Perchloroethylene was fed to the mix tank at a rate of 12 lb/hr. The contents of the mix tank were recirculated through the centrifugal pump and line that went back to the mix tank. A small flowrate of tailings-water-perc suspension was pumped from the circulation loop to a raked settler tank while maintaining a desired level in the mix tank. In the raked settler water phase (containing most of the clay particles) rose to the top and left in the overflow while the perc phase (containing most of the coal particles) left in the sidedraw. The position of the perc-water interface was controlled by the rate of sidedraw discharge. Occasionally, the bottoms from the raked settler were purged for analysis. The solids from each stream were burned in a muffle furnace to determine the percent ash remaining. The coal tailings fed to these contained 39% ash, while solids from the perc sidedraw contained 10.2% ash, the water overflow solids contained 91.5% ash, and the solids from bottoms sample contained 17.8% ash.

Additional experiments were run to determine the effect of the various parameters of each unit operation. Thus, slurry and solvent mixing prior to introduction into the raked settler was investigated. It was found that high intensity mixing followed by a low intensity mixing gave better ash reduction and coal recovery in the raked settler. The data obtained from these tests are set forth in FIG. 5.

Figure 5:
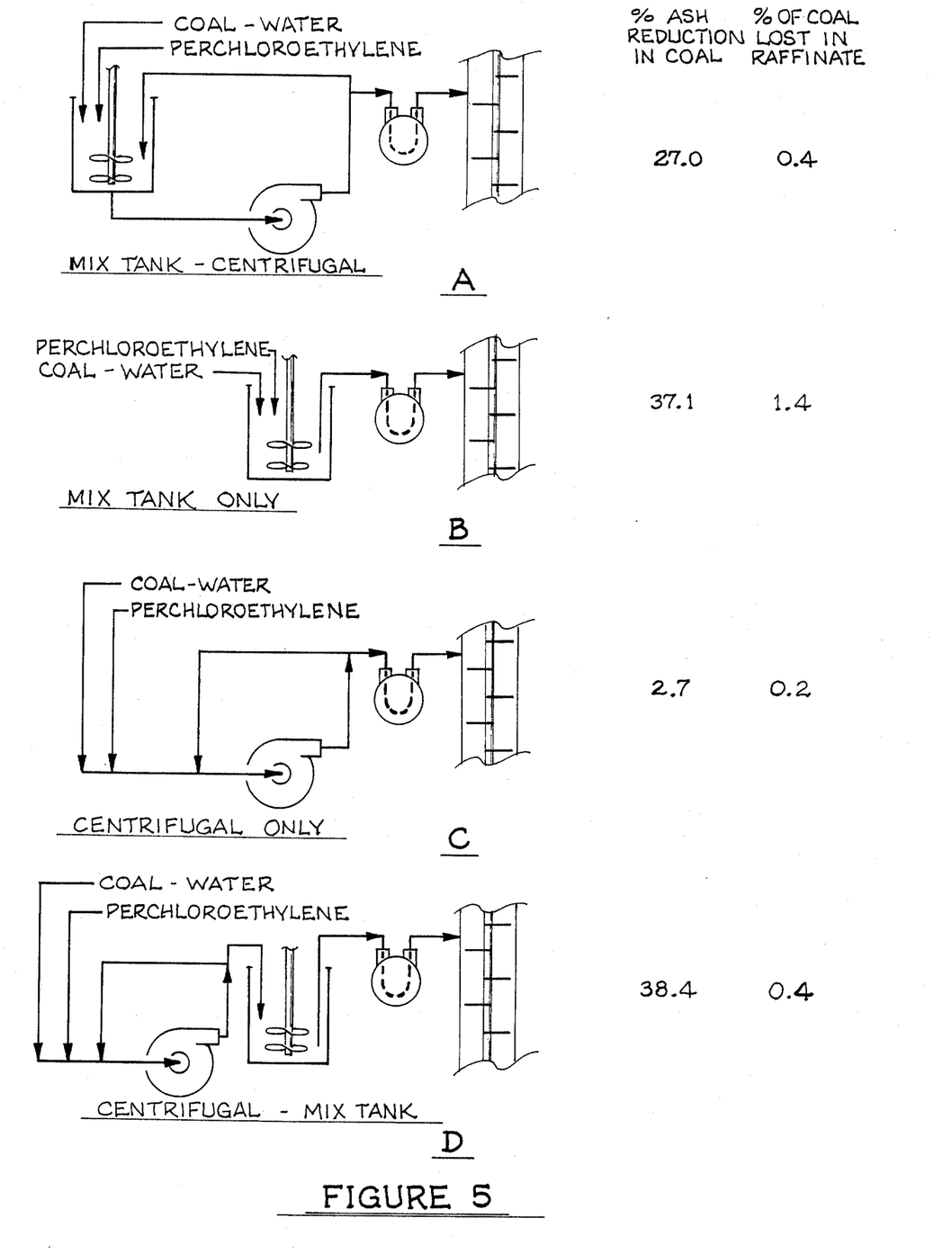
FIG. 5 illustrates the results recovered in a miniplant using an intense mixer and a lower intensity mixer in various combinations.

FIG. 5 shows the results obtained when various mixing combinations were employed. When only a single mix tank was employed the coal lost to the raffinate was high 1.4% but ash reduction was good. A centrifugal pump mixer alone gave excellent recovery of coal, but the ash reduction was almost non-existent, when both a centrifugal pump and a mix tank were used coal loss was low and ash reduction good, the high shear followed by low shear giving best ash reduction with excellent coal recovery.

Figure 8:
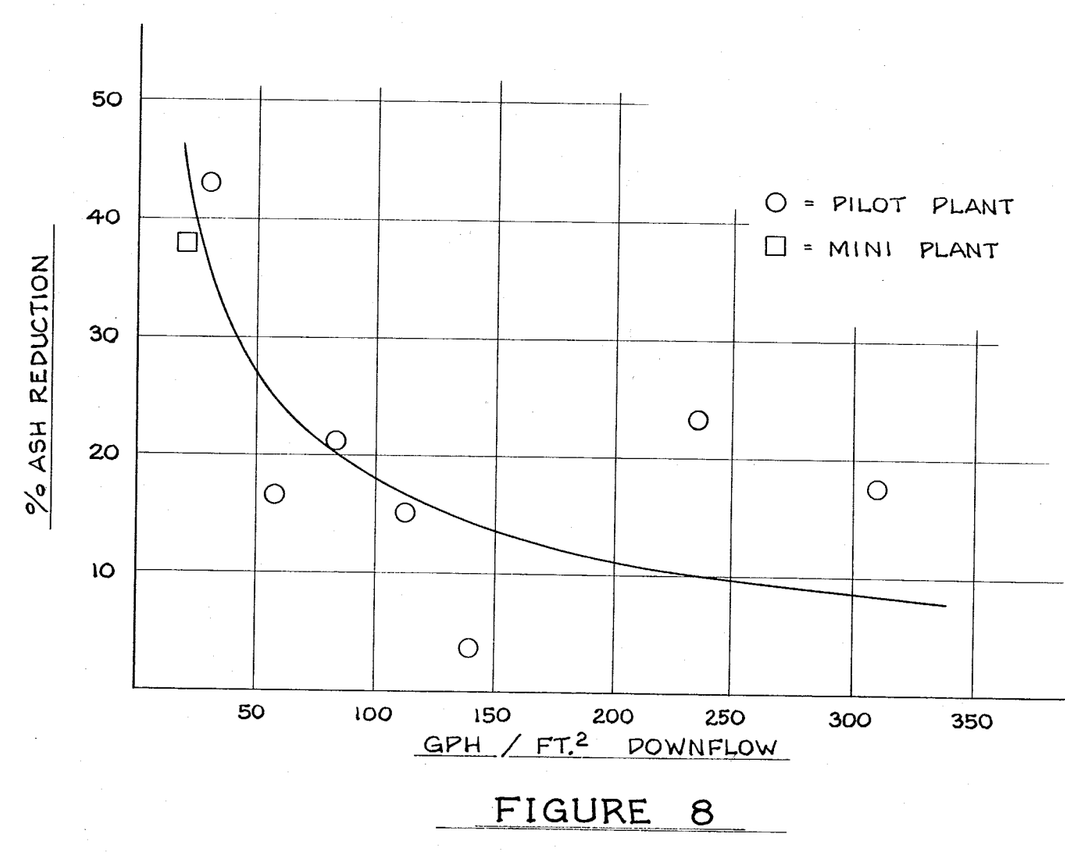

FIG. 8 shows the effect of location of the wash stream in the raked settler. The slower down flow rate and the greater dewatering zone below the water injection point, the less water and thus the less ash in the product.

Figure 7:
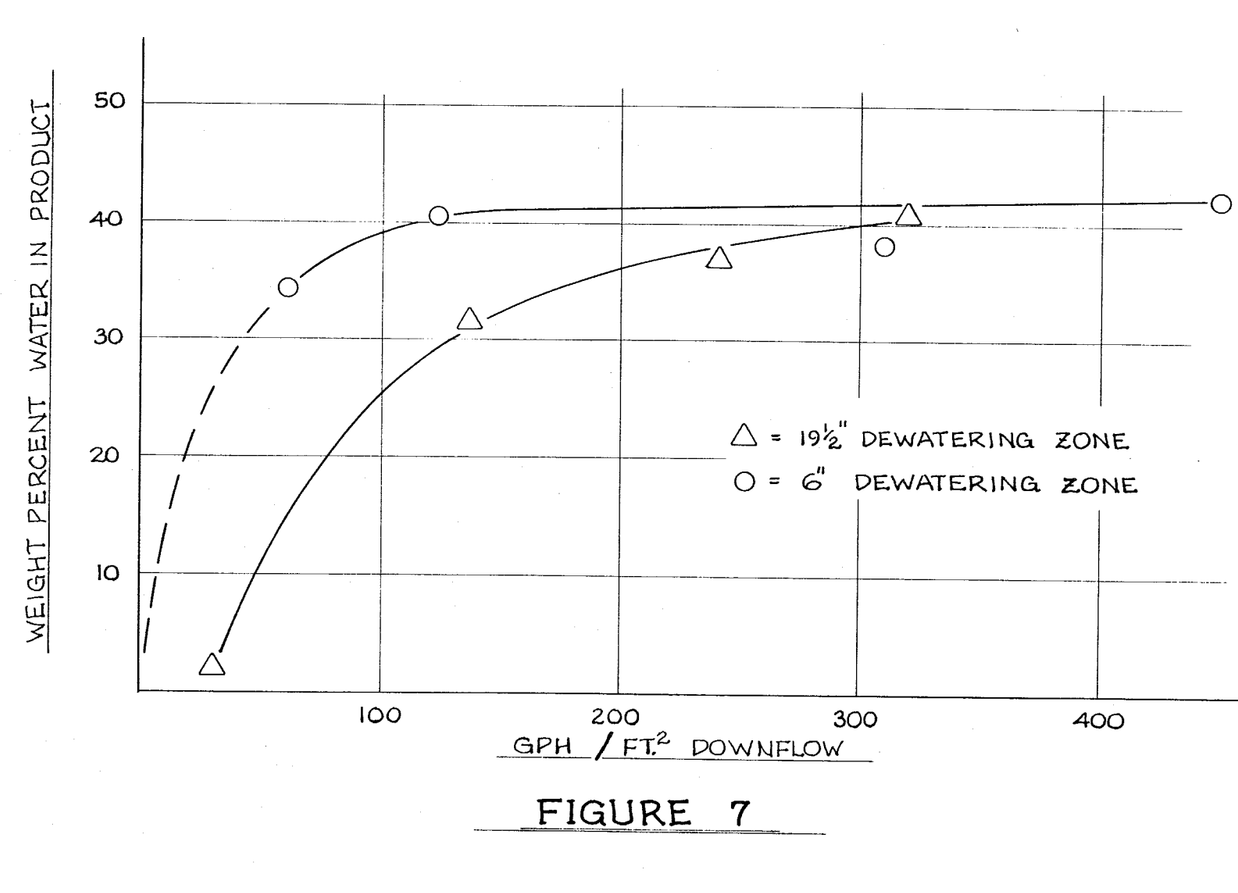
FIGS. 7 and 8 are graphic illustrations of the effect of down flow of the point of introduction rate on the water content of the product and the effect of the location of wash point on the ash and water content, respectively.

FIG. 7 shows the effect of downflow rate on the % ash reduction in the coal.

The percent coal lost was calculated as follows:

$$\% \text{ Coal Lost} = 100 \times \frac{R(1 - a_r)}{F(1 - a_f)}$$

Figure 6:
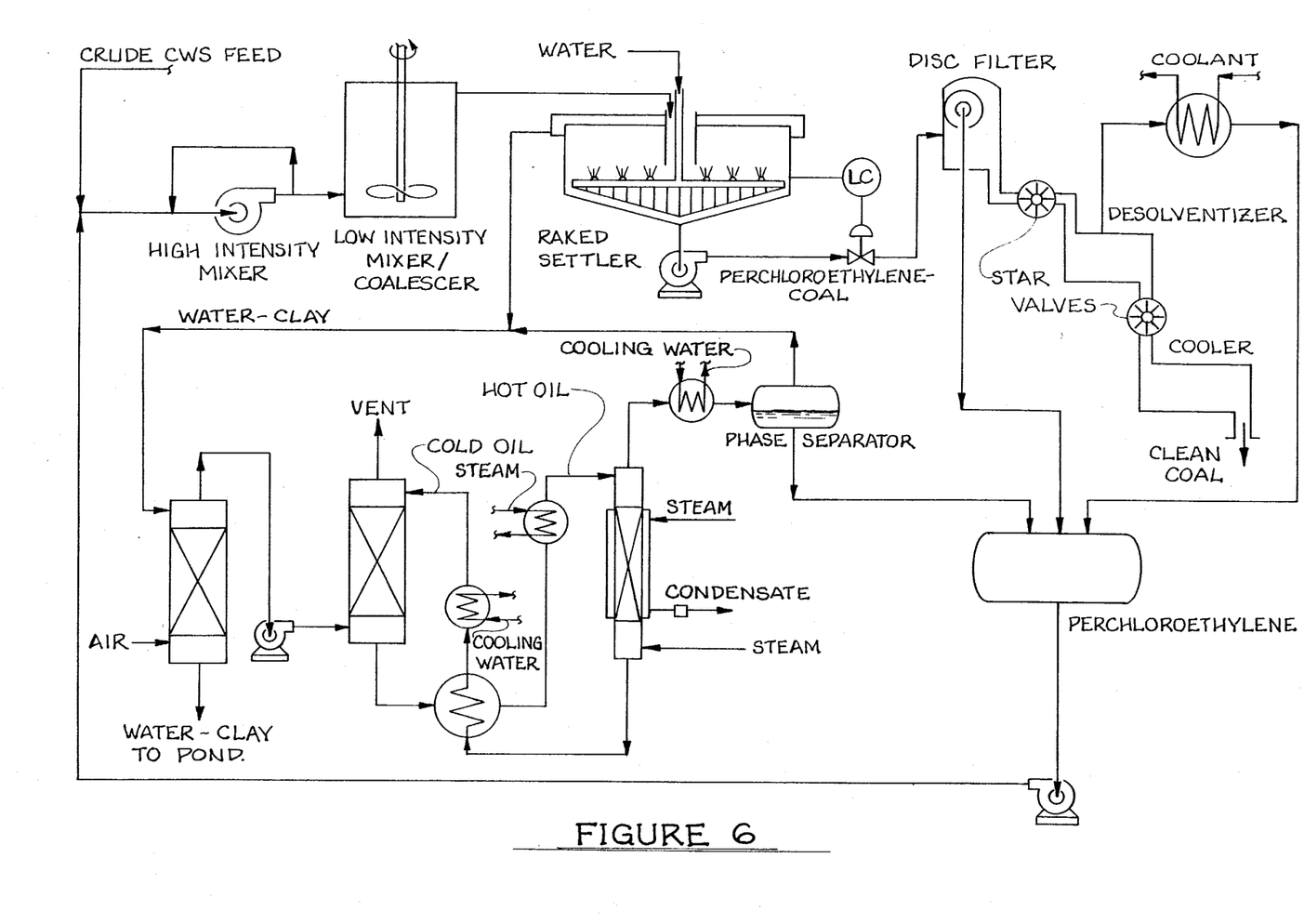
FIG. 6 shows contemplated process for carrying out the present invention including a solvent recovery sections.

R = lb/hr. solids in raffinate stream
F = lb/hr. solids in feed stream
a = wt. fraction ash
sub r = raffinate
sub f = feed The flow sheet shown in FIG. 6 is an illustration of the process unit operations presently considered to represent the best mode for carrying out the present invention based on the results obtained from the miniplants operated to date. In the preferred method the residual heavy media is removed from the clay-water slurry stream from the raked settler by treating the slurry with air; the air thereafter contacted with a cold oil to absorb the heavy media from the air; venting the air; the oil-heavy media thereafter heated and contacted with steam to remove the heavy media as a vapor from the oil; condensing the steam-heavy media vapor and separating the heavy media from the condensed steam; recycling the condensed steam to the raked settler water clay stream and the heavy media to the storage or step 2 of the process.

I claim:

1. A method for treating a coal containing mass to reduce the ash components which comprises:
   (1) crushing said mass smaller than 20 mesh;
   (2) slurrying said crushed mass with water and an immiscible heavier-than-water organic media employing an intense mixing sufficient to cause intimate contact of the crushed mass with each liquid component of the slurry without an appreciable attrition;
   (3) carrying out a mild to substantially quiescent mixing sufficient to allow some initial disengagement of the water phase and its occluded ash from the organic media phase and its occluded coal;
   (4) separating the water phase from said heavier-than-water media phase including their respective solids in a raked settler;
   (5) collecting said separated phases and freeing the solids in each phase from its liquid;
   (6) drying the solids by contact with a heated surface.

2. In the method of claim 1 wherein said mass is run of mine coal.

3. In the method of claim 1 wherein said mass is tailings from a coal processing operation.

4. A method for cleaning a coal containing mass to free it of ash components which comprises:
   (1) crushing said mass to between about +325 and −20 mesh;
   (2) slurrying said crushed mass with water and a chlorinated immiscible organic solvent employing an intense mixing sufficient to cause intimate contact of the crushed mass with each liquid component of the slurry without any appreciable attrition;
   (3) carrying out a mild to substantially quiescent mixing sufficient to allow some initial disengagement of the water phase and its occluded ash from the chloronated solvent phase and its occluded coal;
   (4) separating the water phase from said chlorinated solvent phase including their respective solids in a raked settler;
   (5) collecting said separated phases and freeing the solids in each phase from its liquid;
   (6) drying the solids by contact with a heated surface.

5. In the method of claim 4 wherein said mass is run of mine coal.

6. In the method of claim 4 wherein said mass is tailings from a coal processing operation.

7. A method for cleaning a coal containing mass to free it of ash components which comprises:
   (1) crushing said mass to between about +325 and −20 mesh;
   (2) slurrying said crushed mass with water and a heavy media selected from the group consisting of methylene chloride, 1,1,2-trichloroethylene, 1,1,1-trichloroethane, or perchloroethylene employing an intense mixing sufficient to cause intimate contact of the crushed mass with each liquid component of the slurry without any appreciable attrition;
   (3) carrying out a mild to substantially quiescent mixing sufficient to allow some initial disengagement of the water phase and its occluded ash from the heavy media phase and it occluded coal;
   (4) separating the water phase from said heavy media phase including their respective solids in a raked settler;
   (5) collecting said separated phases and freeing the solids in each phase from its liquid;
   (6) drying the solids by contact with a hot surface.

8. A method of claim 7 wherein said heavy media is perchloroethylene.

9. A method of claim 7 wherein said heavy media is 1,1,2-trichloroethylene.

10. A method of claim 7 wherein said heavy media is 1,1,1-trichloroethane.

11. A method of claim 7 wherein said heavy media is methylene chloride.

12. In the method of claim 1 or 7 wherein the heavy media associated with the clay and water containing residual heavy media from the raked settler is treated with air; the air thereafter contacted with a cold oil to absorb the heavy media from the air; venting the air; the oil-heavy media thereafter heated and contacted with steam to remove the heavy media as a vapor from the oil; condensing the steam-heavy media vapor and separating the heavy media from the condensed steam; recycling the condensed steam to the raked settler water clay stream and the heavy media to the storage or step 2 of the process.

13. A method for cleaning a coal containing mass to free it of ash components which comprises;
   (1) crushing said mass to between about +325 and −20 mesh;
   (2) slurrying said crushed mass with water and a heavy media selected from the group consisting of methylene chloride, 1,1,2-trichloroethylene, 1,1,1- trichloroethane, or perchloroethylene employing an intense mixing sufficient to cause intimate contact of the crushed mass with each liquid component of the slurry without any appreciable attrition;

(3) carrying out a mild to substantially quiescent mixing sufficient to allow some initial disengagement of the water phase and its occluded ash from the heavy media phase;

(4) separating the water phase from said heavy media phase including their respective solids in a raked settler;

(5) collecting said separated phases and desolventizing said coal phase.

* * * * *